(12) United States Patent
Kojo

(10) Patent No.: US 11,138,896 B2
(45) Date of Patent: Oct. 5, 2021

(54) INFORMATION DISPLAY APPARATUS, INFORMATION DISPLAY METHOD, AND COMPUTER-READABLE RECORDING MEDIUM

(71) Applicant: CASIO COMPUTER CO., LTD., Tokyo (JP)

(72) Inventor: Takashi Kojo, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 227 days.

(21) Appl. No.: 15/925,715

(22) Filed: Mar. 19, 2018

(65) Prior Publication Data

US 2018/0277006 A1  Sep. 27, 2018

(30) Foreign Application Priority Data

Mar. 22, 2017 (JP) .............................. JP2017-055600

(51) Int. Cl.
*G09B 7/02* (2006.01)
*G06F 3/0488* (2013.01)
(Continued)

(52) U.S. Cl.
CPC ............ *G09B 7/02* (2013.01); *G06F 1/1647* (2013.01); *G06F 3/03545* (2013.01);
(Continued)

(58) Field of Classification Search
CPC ... G09B 7/00; G09B 7/02; G09B 7/06; G09B 5/10; G09B 5/125; G09B 5/14;
(Continued)

(56) References Cited

U.S. PATENT DOCUMENTS 4,456,973 A   6/1984  Carlgren et al.
6,154,757 A  11/2000  Krause et al.
(Continued)

FOREIGN PATENT DOCUMENTS

CN   1474303 A   2/2004
CN   1811778 A   8/2006
(Continued)

OTHER PUBLICATIONS

Japanese Office Action (and English language translation thereof) dated Dec. 1, 2020 issued in related Japanese Application No. 2017-057238.
(Continued)

*Primary Examiner* — Jack Yip
(74) *Attorney, Agent, or Firm* — Holtz, Holtz & Volek PC

(57) ABSTRACT

According to one embodiment, there is provided an information display apparatus including a processor, the processor being configured to: designate at least one keyword in a text displayed in a display unit in accordance with a user operation; cause the display unit to display an image associated with the designated keyword register the designated keyword and information of the image in a memory as data in which the designated keyword and the information of the image are associated with each other; output a problem based on the registered keyword and the image corresponding to the registered information.

19 Claims, 10 Drawing Sheets

(51) Int. Cl.
*G09B 5/10* (2006.01)
*G06F 1/16* (2006.01)
*G06F 3/0354* (2013.01)
*G09B 5/14* (2006.01)
*G06F 3/0483* (2013.01)
*G06F 3/0484* (2013.01)
*G09B 5/12* (2006.01)
*G06F 3/0485* (2013.01)

(52) U.S. Cl.
CPC .......... *G06F 3/0483* (2013.01); *G06F 3/0488* (2013.01); *G06F 3/04845* (2013.01); *G06F 3/04883* (2013.01); *G09B 5/10* (2013.01); *G09B 5/125* (2013.01); *G09B 5/14* (2013.01); *G06F 3/0485* (2013.01); *G06F 3/04842* (2013.01); *G06F 2203/04806* (2013.01)

(58) Field of Classification Search
CPC .. G06F 1/1647; G06F 3/03545; G06F 3/0483; G06F 3/04845; G06F 3/0488; G06F 3/04883; G06F 3/04842; G06F 3/0485; G06F 2203/04806
USPC ....................................................... 434/350
See application file for complete search history.

(56) References Cited

U.S. PATENT DOCUMENTS

| | | |
|---|---|---|
| 6,175,841 B1 | 1/2001 | Loiacono |
| 7,717,712 B2 | 5/2010 | Brun et al. |
| 8,250,071 B1 | 8/2012 | Killalea et al. |
| 9,460,162 B1 | 10/2016 | Ostler et al. |
| 9,466,225 B2 | 10/2016 | Mori et al. |
| 9,812,028 B1 | 11/2017 | Elchik et al. |
| 10,460,023 B1 | 10/2019 | Shriver |
| 2004/0023191 A1 | 2/2004 | Brown et al. |
| 2005/0079477 A1 | 4/2005 | Diesel et al. |
| 2005/0153263 A1* | 7/2005 | De Ley ................. G09B 17/00 434/169 |
| 2007/0072164 A1 | 3/2007 | Katsuyama et al. |
| 2007/0136657 A1 | 6/2007 | Blumenthal et al. |
| 2007/0269775 A1 | 11/2007 | Andreev et al. |
| 2007/0298384 A1 | 12/2007 | Jenkins et al. |
| 2008/0318200 A1 | 12/2008 | Hau et al. |
| 2010/0021871 A1 | 1/2010 | Layng et al. |
| 2010/0273138 A1 | 10/2010 | Edmonds et al. |
| 2011/0093292 A1 | 4/2011 | Hussam |
| 2011/0093481 A1 | 4/2011 | Hussam |
| 2012/0329013 A1 | 12/2012 | Chibos |
| 2013/0073932 A1 | 3/2013 | Migos et al. |
| 2013/0073998 A1* | 3/2013 | Migos ................... G06F 40/106 715/776 |
| 2013/0080471 A1* | 3/2013 | Forte ................... G06F 21/6218 707/785 |
| 2013/0275120 A1 | 10/2013 | Degross |
| 2014/0024009 A1 | 1/2014 | Nealon et al. |
| 2014/0220540 A1* | 8/2014 | Burgin ..................... G09B 7/07 434/362 |
| 2014/0335497 A1* | 11/2014 | Gal .......................... G09B 7/00 434/323 |
| 2015/0044653 A1 | 2/2015 | Levine |
| 2015/0088932 A1 | 3/2015 | Sauz |
| 2015/0104762 A1 | 4/2015 | Luke et al. |
| 2015/0106703 A1 | 4/2015 | Fraundorf et al. |
| 2015/0254999 A1 | 9/2015 | Goll et al. |
| 2015/0375093 A1* | 12/2015 | Casey ..................... A63F 1/04 273/292 |
| 2016/0155348 A1 | 6/2016 | Hall |
| 2017/0293826 A1 | 10/2017 | Kemmochi et al. |
| 2018/0011830 A1 | 1/2018 | Iida et al. |
| 2018/0061256 A1* | 3/2018 | Elchik ..................... G09B 7/06 |
| 2018/0061274 A1* | 3/2018 | Frahling ............... G06F 40/169 |
| 2018/0126260 A1 | 5/2018 | Chansoriya et al. |
| 2018/0277008 A1 | 9/2018 | Kojo |
| 2018/0277009 A1 | 9/2018 | Kojo |

FOREIGN PATENT DOCUMENTS

| | | |
|---|---|---|
| CN | 102693300 A | 9/2012 |
| JP | 06236138 A | 8/1994 |
| JP | 07078148 A | 3/1995 |
| JP | 2002062792 A | 2/2002 |
| JP | 2002268536 A | 9/2002 |
| JP | 2003036016 A | 2/2003 |
| JP | 2004258184 A | 9/2004 |
| JP | 2005070939 A | 3/2005 |
| JP | 2007094055 A | 4/2007 |
| JP | 2010175699 A | 8/2010 |
| JP | 2010284797 A | 12/2010 |
| JP | 2013072927 A | 4/2013 |
| JP | 2013161463 A | 8/2013 |
| JP | 2014038209 A | 2/2014 |
| JP | 2015125561 A | 7/2015 |
| JP | 2016156883 A | 9/2016 |
| JP | 2017049529 A | 3/2017 |
| WO | 2016117321 A1 | 7/2016 |

OTHER PUBLICATIONS

Yuji, et al., "Information Exchange, 3 Making of electronic blackboard /notebook system that is possible, Research Report vol. 2001 No. 122 of Information Processing Society," Incorporated Information Processing Society, Dec. 14, 2001, pp. 33-40.
Japanese Office Action (and English language translation thereof) dated Oct. 13, 2020 issued in Japanese Application No. 2017-055584.
Notice of Allowance dated Dec. 11, 2020 issued in related U.S. Appl. No. 15/925,696.
Notice of Allowance dated Dec. 11, 2020 issued in related U.S. Appl. No. 15/925,736.
Office Action (Final Rejection) dated Sep. 25, 2020 issued in related U.S. Appl. No. 15/925,736.
Office Action (Non-Final Rejection) dated Mar. 26, 2020 issued in U.S. Appl. No. 15/925,696.
Office Action (Non-Final Rejection) dated Mar. 27, 2020 issued in U.S. Appl. No. 15/925,736.
Related U.S. Appl. No. 15/925,736; First Named Inventor: Takashi Kojo; Title: "Information Display Apparatus, Information Display Terminal, Method of Controlling Information Display Apparatus, Method of Controlling Info"; Filed: Mar. 19, 2018.
Related U.S. Appl. No. 15/925,696; First Named Inventor: Takashi Kojo; Title: "Information Display Apparatus, Information Display Method, and Computer-Readable Recording Medium"; Filed: Mar. 19, 2018.
Chinese Office Action (and English language translation thereof) dated Jul. 21, 2021, issued in counterpart Chinese Application No. 201810241446.1.

* cited by examiner

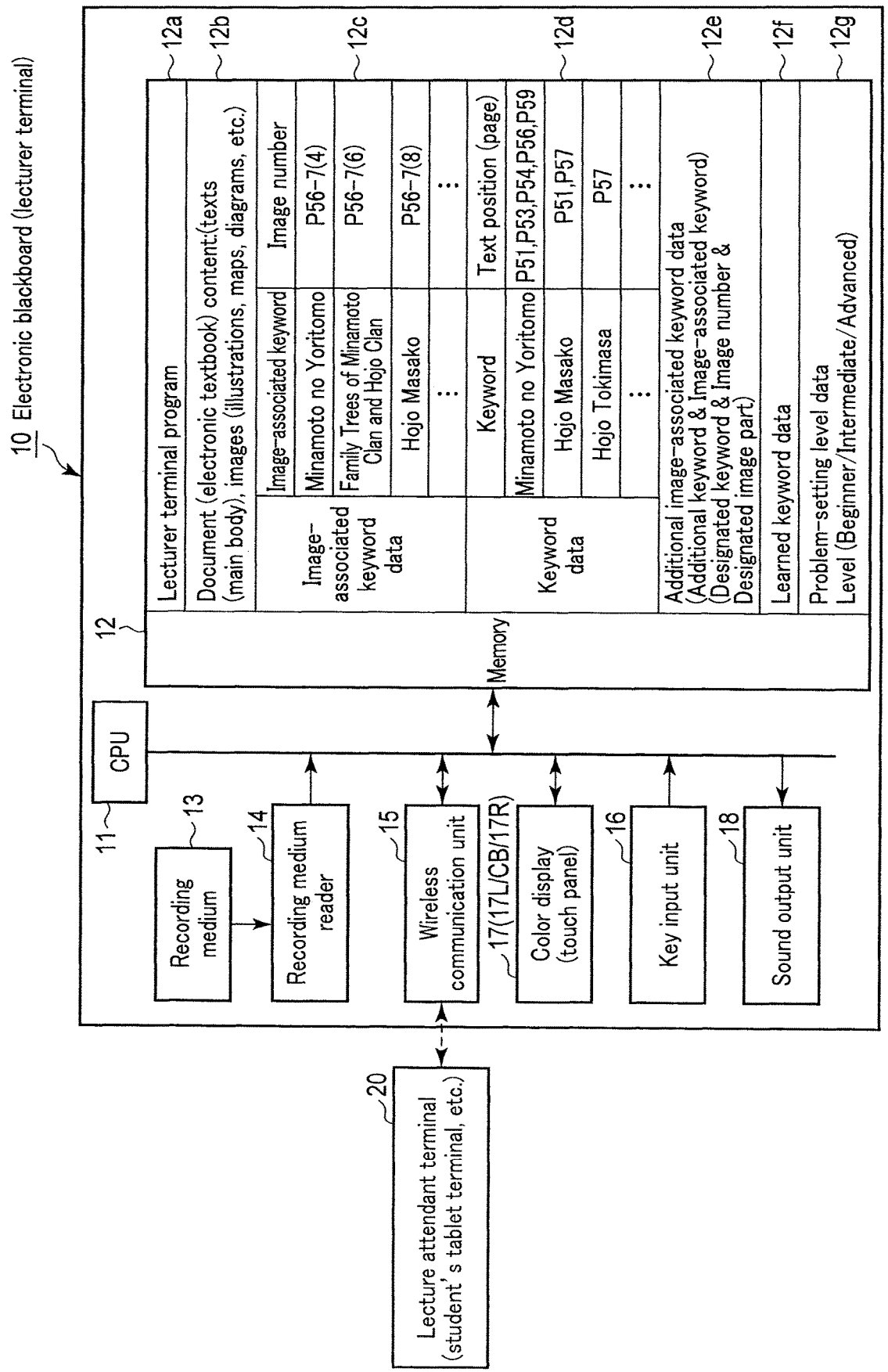
F I G. 2

INFORMATION DISPLAY APPARATUS, INFORMATION DISPLAY METHOD, AND COMPUTER-READABLE RECORDING MEDIUM

CROSS-REFERENCE TO RELATED APPLICATIONS

This application is based upon and claims the benefit of priority from prior Japanese Patent Application No. 2017-055600, filed Mar. 22, 2017, the entire contents of which are incorporated herein by reference.

BACKGROUND OF THE INVENTION

1. Field of the Invention

The present invention relates to an information display apparatus for giving an effective lecture, an information display method, and a computer-readable recording medium.

2. Description of the Related Art

In a conventionally conceived system, education or learning is carried out by using electronic educational materials.

In this system, for example, a learning support server, which is connected to a Web server that provides educational material information and examination problems to terminals of lecture attendants, stores educational material proposal effect information which is obtained by analyzing answer histories of multiple lecture attendants. When examination problems that are presented to the lecture attendants require knowledge of other already learned educational materials in addition to the educational materials learned this time, educational materials that are effective for the lecture attendants are selected based on the answer history information for each lecture attendant and the above-described educational material proposal effect information. The selected educational materials are reported to the Web server as the next proposed educational material. Thereby, in accordance with the examination results, the next educational materials suitable for the lecture attendants can be presented. An e-learning system has been proposed (see, for example, Jpn. Pat. Appln. KOKAI Publication No. 2010-175699).

Specifically, the conventional e-learning system presents the next educational materials suitable for lecture attendants from among the other already learned educational materials, based on the examination results of the test problems prepared in advance. Thereby, knowledge, which was already learned but is considered as insufficient in lecture attendants, is presented once again. Thereby, additional learning support is provided after the learning of the lecture attendants.

BRIEF SUMMARY OF THE INVENTION

According to one embodiment, there is provided an information display apparatus including a processor, the processor being configured to: designate at least one keyword in a text displayed in a display unit in accordance with a user operation; cause the display unit to display an image associated with the designated keyword; register the designated keyword and information of the image in a memory as data in which the designated keyword and the information of the image are associated with each other; output a problem based on the registered keyword and the image corresponding to the registered information.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram illustrating a configuration of electronic circuitry of the electronic blackboard (lecturer terminal) 10.

DETAILED DESCRIPTION OF THE PREFERRED EMBODIMENTS

Embodiments of the present invention will be described hereinafter with reference to the accompanying drawings.

Figure 1:
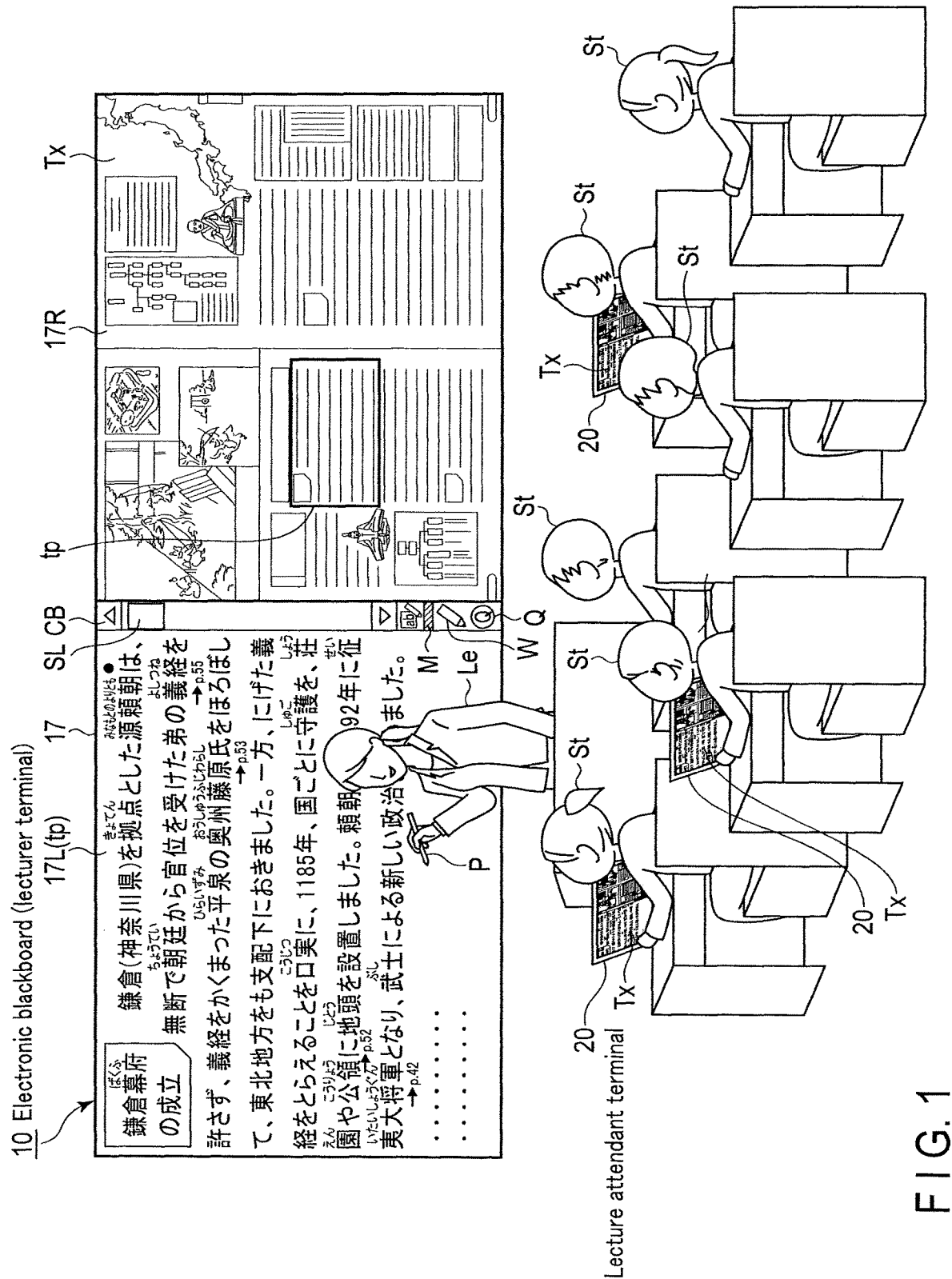
FIG. 1 is a conceptual view illustrating an external appearance structure of an electronic blackboard (lecturer terminal) 10 according to an embodiment of an information display apparatus of the present invention.

FIG. 1 is a conceptual view illustrating an external appearance structure of an electronic blackboard (lecturer terminal) 10 according to an embodiment of an information display apparatus of the present invention.

The electronic blackboard (lecturer terminal) 10 includes a touch panel (touched position detection device)-equipped color display 17 (17L/CB/17R) having a display screen with a size that can serve as a blackboard or a whiteboard used for lectures, and has a left screen 17L and a right screen 17R for displaying data divided into the left and right, as shown in FIG. 1.

The electronic blackboard (lecturer terminal) 10 may be composed of a tablet terminal, or a personal computer or the like including a touch panel-equipped display. Display data, which is generated and displayed by the personal computer or the like, maybe displayed on a large-screen display device for lectures, on which the left screen 17L and the right screen 17R are set.

The electronic blackboard (lecturer terminal) 10 may be configured to include a normal blackboard (or whiteboard) (corresponding to the left screen 17L) which itself does not have a display function; a large-screen display device (corresponding to the right screen 17R) which is placed next to the blackboard 10; a pen position sensor which detects a designated position and a movement of a pen P on the blackboard 10; an imaging recognition device which captures an image shown on the blackboard (the left screen 17L) and recognizes characters or pictures included in the captured image or an image displayed on the display device (the right screen 17R); and an image generation device which generates an image based on the position/locus of the pen P on the blackboard 10 detected by the pen position sensor and the characters or pictures on the blackboard 10 recognized by the imaging recognition device; a projector device that projects and displays the image generated by the image generation device on the blackboard (the left screen 17L); a display control device which causes the display device (the right screen 17R) to display an image generated by the image generation device; and a control device (CPU) that controls an entire system that includes the display device (the right screen 17R), the pen position sensor, the image recognition device, the image generation device, the projector device, and the display control device.

Hereinafter, the electronic blackboard (lecturer terminal) 10 including the touch panel-equipped color display 17 (17L/CB/17R) will be described.

Data of an entire two-page spread Tx of a textbook of a lecture subject (electronic textbook) is displayed on the right screen 17R of the electronic blackboard (lecturer terminal) 10. Data of a text part tp included in the two-page spread Tx displayed on the right screen 17R is enlarged and displayed on the left screen 17L.

A control box CB is arranged between the left screen 17L and the right screen 17R of the electronic blackboard (lecturer terminal) 10, and the text part tp in the two-page spread Tx that is enlarged and displayed on the left screen 17L, is scrolled for display by moving the scroll icon SL in the control box CB.

In addition to the scroll icon SL, a marker icon M for setting a color of a marker to be displayed on the left screen 17L, a handwriting icon W for setting a handwriting input mode, and a problem-setting icon Q for instructing problem-setting are arranged in the control box CB.

The lecturer Le indicates important persons and items, etc. using a pen P on the text part tp displayed on the left screen 17L that is the enlarged text part tp of the two-page spread Tx of the text book (electronic text book) displayed on the right screen 17R.

Each lecture attendant St (e.g., a student) has a lecture attendant terminal (a tablet terminal or the like) 20, and attends a lecture with the lecture attendant terminal (a tablet terminal or the like) 20 displaying the two-page spread Tx of the textbook (electronic textbook) of the lecture subject delivered from the electronic blackboard (lecturer terminal) 10 by wireless communication. Problem data delivered from the blackboard (lecturer terminal) 10 through a wireless communication is displayed, and the lecture attendants learn through answering the displayed problems. The problem data is automatically generated as problem data in accordance with a lecture method during the process of the lecture using the electronic blackboard (lecturer terminal) 10.

FIG. 2 is a block diagram illustrating a configuration of electronic circuitry of the electronic blackboard (lecturer terminal) 10.

The electronic blackboard (lecturer terminal) 10 includes a CPU 11 which is a computer. The CPU 11 controls the operations of respective circuitry components according to a lecturer terminal program 12a which is pre-stored in a memory 12 such as a flash ROM. The lecturer terminal program 12a may be read from an external recording medium 13 such as a memory card by a recording medium reader 14 and stored in the memory 12, or may be downloaded from an external communication device (not shown) via a wireless communication unit 15 and stored in the memory 12.

The memory 12, the recording medium reader 14, and the wireless communication unit 15 are connected to the CPU 11. In addition, a key input unit 16, the touch panel-equipped color display 17 (17L/CB/17R) and a sound output unit 18 are connected to the CPU 11.

In the memory 12, a document (electronic textbook) content area 12b, an image-associated keyword data area 12c, a keyword data area 12d, an additional image-associated keyword data area 12e, a learned keyword data area 12f, and a problem setting level data area 12g, etc., are allocated.

In the document (electronic textbook) content area 12b, content data of various textbooks (electronic textbooks) are stored as well as text (main body) data and image (illustrations, maps, diagrams, etc.) data.

In the image-associated keyword data area 12c, a keyword of, for example, an important person or item, and an image representing the keyword that is included in each textbook (electronic textbook) stored in the document (electronic textbook) content area 12b, are stored as an image-associated keyword and an image number consisting of a page and a number where the image is shown. For example, image data of, for example, a historical figure such as Minamoto no Yoritomo associated with the image-associated keyword [Minamoto no Yoritomo] is associated with number (4) in [P56-7] of the two-page spread Tx in the data of the textbook (electronic textbook), and is arranged.

In the keyword data area 12d, a keyword of, for example, an important person or item that is included in each textbook (electronic textbook) stored in the document (electronic textbook) content area 12b is associated with a text position (page) in the data of the textbook (electronic textbook) which includes the keyword, and is stored. For example, the keyword [Minamoto no Yoritomo] is included in page [P51, P53, P54, P56, P59] of the data of the textbook (electronic textbook). The following configuration may be adopted: specifically, the content data of various textbooks (electronic textbooks) stored in the document (electronic textbook) content area 12b, the data of the image-associated keywords and the image numbers stored in the image-associated keyword data area 12c, and the data of the keywords and the text positions (pages) thereof stored in the keyword data area 12d, may be downloaded and acquired from a server apparatus (a document (electronic textbook) content providing server) on a communication network (not shown) such as the Internet via a communication means such as a network communication device and wireless communication unit 15, in accordance with the necessity in connection with the operation of the electronic blackboard (lecturer terminal) 10 according to the lecturer terminal program 12a.

In the process of giving a lecture by the lecturer Le, a character string included in the text part tp displayed on the left screen 17L is first designated as an additional keyword by a user (e.g., the lecturer Le) operation, and an image displayed on the right screen 17R is then designated by the pen P. In this case, the additional keyword and an image-associated keyword associated with an image number of the designated image are associated and stored in the additional image-associated keyword data area 12e.

While an image displayed on the right screen 17R is designated and the designated image is enlarged and displayed on the right screen 17R, a keyword or an additional keyword included in the text part tp displayed on the left screen 17L is first designated by a user (e.g., the lecturer Le) operation, and a part of the enlarged image displayed on the right screen 17R is then designated. In this case, the designated keyword, an image number of the designated image, and position information of the part designated in the image (the designated image part) are associated and stored in the additional image-associated keyword data area 12e.

By a user (e.g., the lecturer Le) operation, an image-associated keyword included in the text part tp displayed on the left screen 17L is designated, and an enlarged image associated with the image-associated keyword displayed on the right screen 17R is designated. In this case, the designated image-associated keyword is registered and stored in the learned keyword data area 12f as a learned keyword.

If an additional keyword and an image-associated keyword are associated and stored in the additional image-associated keyword data area 12e by a user (e g., the lecturer Le) operation, data of the additional image-associated keyword in which the additional keyword and the image-associated keyword are associated is registered and stored in the learned keyword data area 12f as a learned keyword.

If a designated keyword, an image number of a designated image, and a designated image part in the image are associated and stored in the additional image-associated keyword data area 12e, and data of an additional image-associated keyword in which the designated keyword, the image number, and the designated image part are associated is registered and stored in the learned keyword data area 12f as a learned keyword.

Herein, the electronic blackboard (lecturer terminal) 10 has a function of generating, if data of a learned keyword is stored in the learned keyword data area 12f, problem data based on the data of a learned keyword in response to a touch operation on the problem setting icon Q in the control box CB, a function of displaying and outputting a problem to the touch panel-equipped color display 17 (17L/17R), and a function of sending and outputting a problem to a lecture attendant terminal 20 (tablet terminal, etc.) of each lecture attendant St (e.g., a student). At this time, a difficulty level of problem data (problem setting level) is changed from a beginner level to an intermediate level and then to an advanced level, every time problem data is generated based on data of the same learned keyword, and problem data at the changed problem setting level is generated.

A current problem setting level of the problem data generated based on data of a learned keyword stored in the learned keyword data area 12f is associated with the data of the learned keyword data, and stored in the problem setting level data area 12g.

In the electronic blackboard (lecturer terminal) 10 with the above-described configuration, the CPU 11 controls the operations of the respective circuitry components according to the instructions described in the lecturer terminal program 12a, and the software and hardware cooperate to realize a function of generating problem data corresponding to lecture content and a problem-setting function of the problem data, which will be described in the following operational description.

Next, the operation of the electronic blackboard (lecturer terminal) 10 with the configuration will be described.

Figure 3:
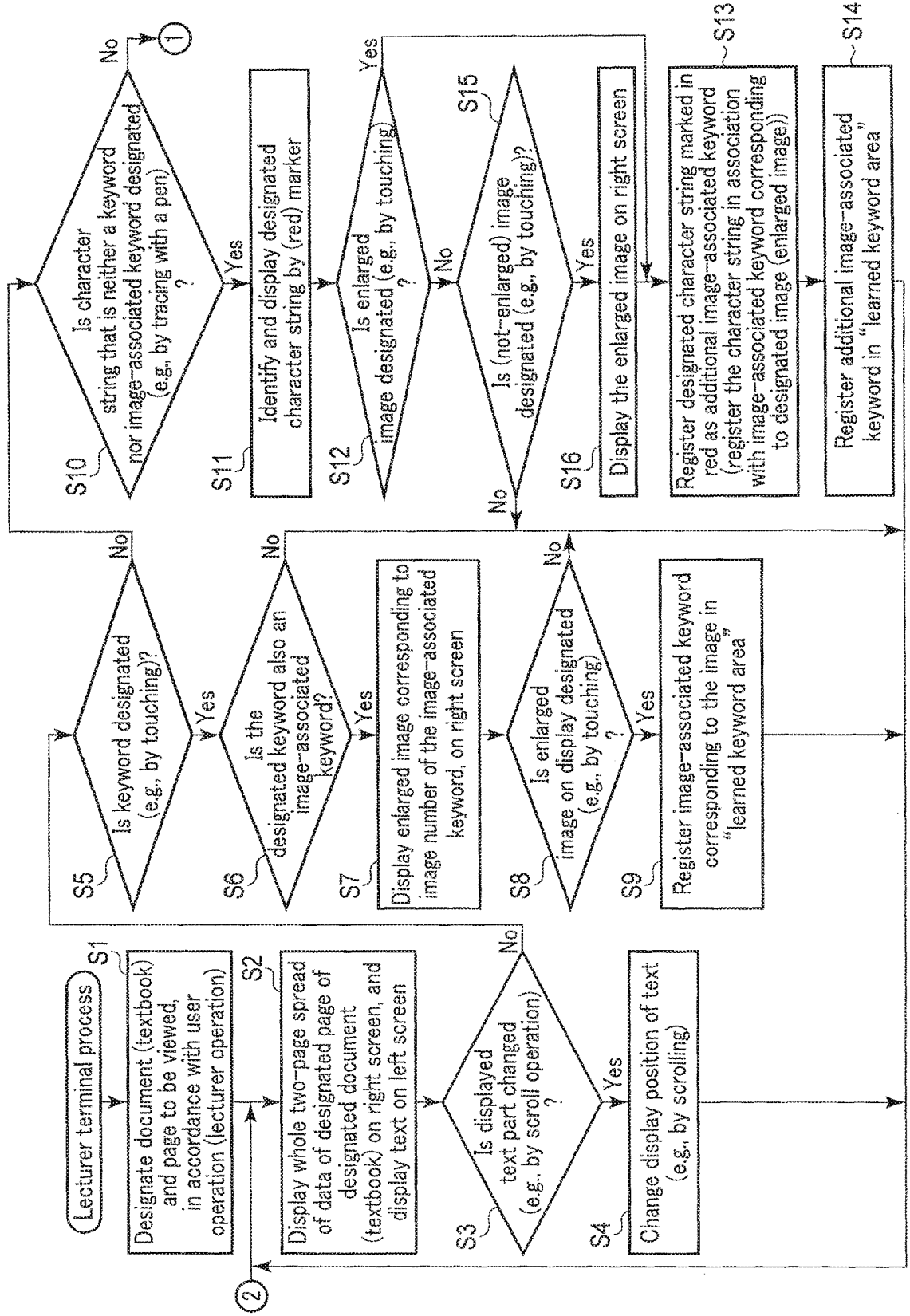
FIG. 3 is a flowchart illustrating a lecturer terminal process (part 1) of the electronic blackboard (lecturer terminal) 10.
Figure 4:
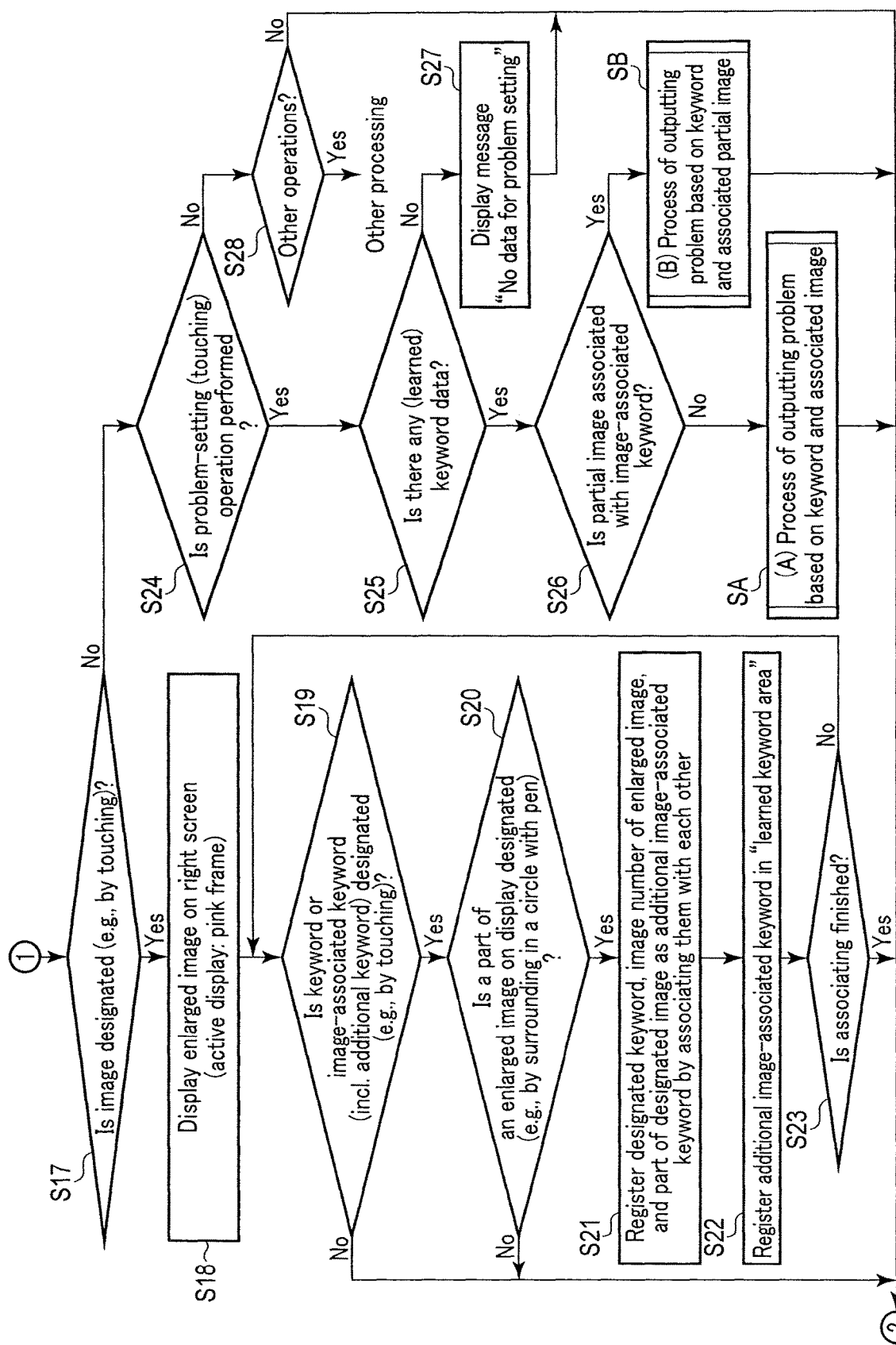
FIG. 4 is a flowchart illustrating a lecturer terminal process (part 2) of the electronic blackboard (lecturer terminal) 10.
Figure 5:
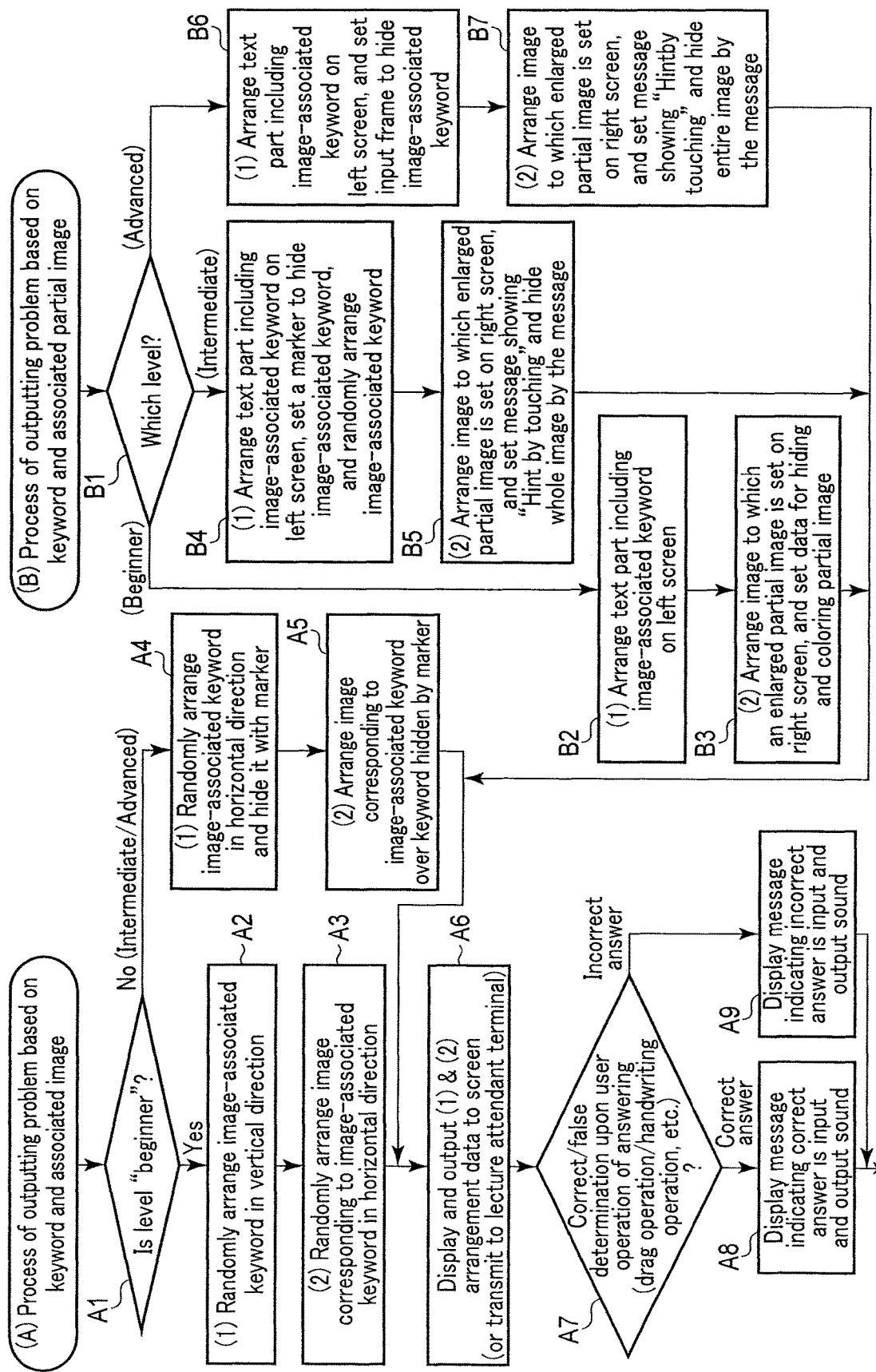
FIG. 5 is a flowchart illustrating a lecturer terminal process (part 3) of the electronic blackboard (lecturer terminal) 10.

FIG. 3, FIG. 4 and FIG. 5 are flowcharts illustrating a lecturer terminal process (part 1, part 2, and part 3) of the electronic blackboard (lecturer terminal) 10.

Figure 6:
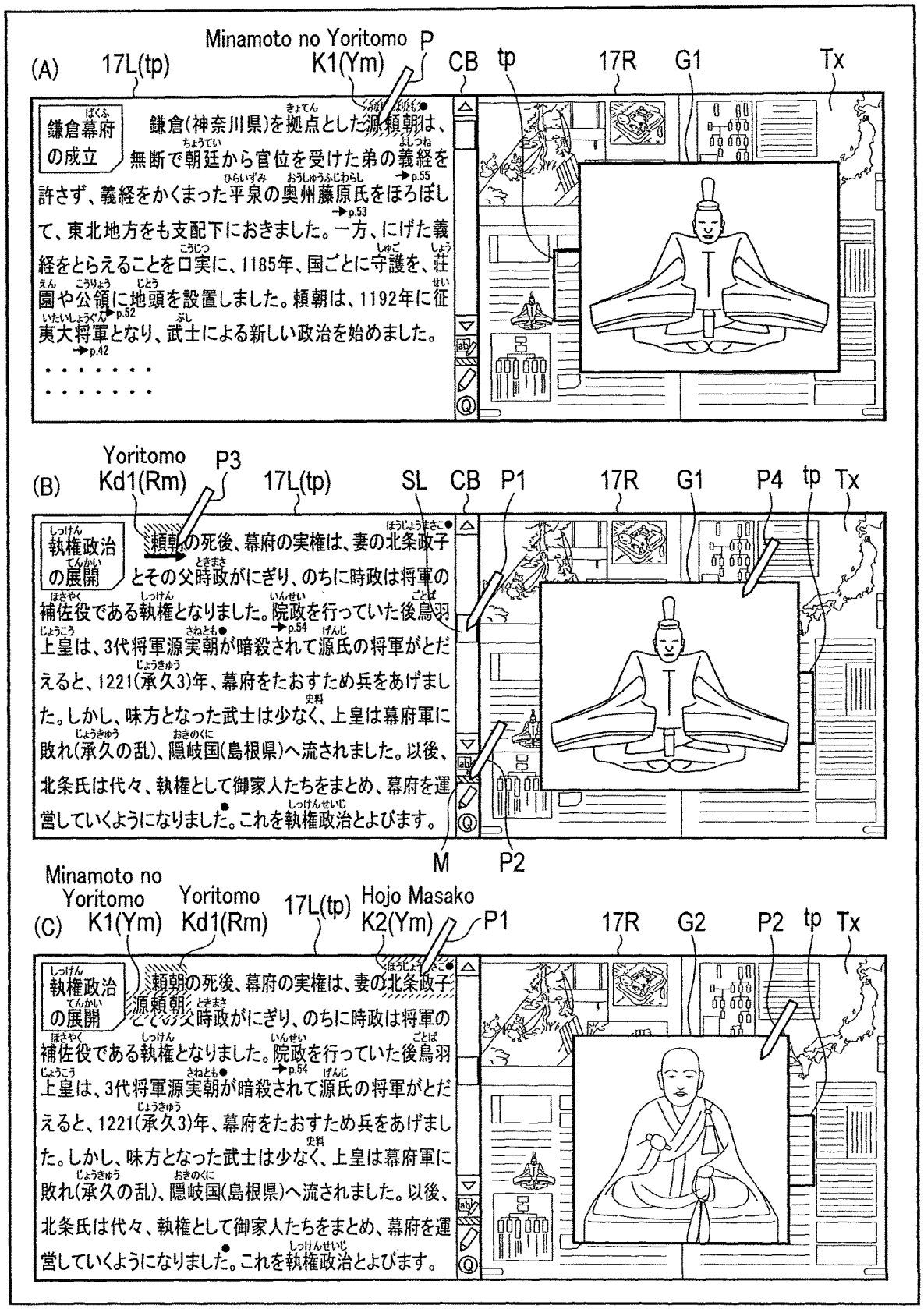
FIG. 6 is a diagram illustrating a display operation (part 1) of lecture content corresponding to a user (lecturer) operation according to the lecturer terminal process (part 1) of the electronic blackboard (lecturer terminal) 10.

FIG. 6 is a diagram illustrating a display operation (part 1) of lecture content corresponding to a user (lecturer) operation according to the lecturer terminal process (part 1) of the electronic blackboard (lecturer terminal) 10.

First, a document (textbook) and a two-page spread Tx (P56-57 of "Junior High School History"), which are to be viewed in the present lecture, are designated (step S1) in accordance with a user (lecturer) operation of the key input unit 16, or of the touch panel-equipped color display 17. Then, data of the designated two-page spread Tx (P56-57) of the designated document (textbook) "Junior High School History" is read from the document (electronic textbook) content area 12b in the memory 12, and the data of the entire two-page spread Tx (P56-57) is displayed on the right screen 17R of the touch panel-equipped color display 17, as illustrated in FIG. 1 (step S2). On the left screen 17L, the beginning part of a text part tp included in the data of whole two-page spread Tx (P56-57) is enlarged and displayed (step S2).

Then, if the lecturer Le moves the scroll icon SL in the control box CB (step S3 (Yes)), the data of whole two-page spread Tx (P56-57) is scrolled and a text part tp is enlarged and displayed on the left screen 17L (step S4).

The lecturer Le thereby displays among the data of the two-page spread Tx (P56-57) of the document (textbook) displayed on the right screen 17R, which is a current lecture subject, the enlarged text part tp that is the focus of the lecture on the left screen 17L, and continues the lecture, pointing out important matters with a pen P or the like (step S3, step S4),.

As shown in (A) of FIG. 6, when the image-associated keyword [Minamoto no Yoritomo] K1 is touched and designated by the pen P in the text part tp displayed on the left screen 17L (step S5 (Yes), step S6 (Yes)), the designated image-associated keyword [Minamoto no Yoritomo] K1 is identified and displayed by a yellow marker Ym. Thereafter, in accordance with the image number [P56-7 (4) ] associated with the designated image-associated keyword [Minamoto no Yoritomo] K1 and stored in the image-associated keyword data area 12c, an image G1 of Minamoto no Yoritomo included in the data of the two-page spread Tx displayed on the right screen 17R is enlarged and displayed on the right screen 17R (step S7).

After displaying the text part tp on the left screen 17L by scrolling in accordance with moving of the scroll icon SL in the control box CB as indicated by the pen P1 in (B) of FIG. 6 (step S3, step S4), a marker color is set to red by operating the marker icon M as indicated by the pen P2, and when a character string representing "Yoritomo" who is the same person as Minamoto no Yoritomo (image G1) (which is currently not a keyword nor an image-associated keyword) displayed on the right screen 17R is touched and designated as indicated by the pen P3 (step S10 (Yes)), the designated character string is identified and displayed by a red marker Rm as the additional keyword [Yoritomo] Kd1 (step S11).

When the enlarged image G1 of Minamoto no Yoritomo on display is designated by touching as indicated by the pen P4 (step S12 (Yes)), the additional keyword [Yoritomo] Kd1 and the image-associated keyword [Minamoto no Yoritomo] K1 which is associated with an image number of the designated image G1 of Minamoto no Yoritomo are associated with each other, and then registered and stored in the additional image-associated keyword data area 12e (step S13).

Thereafter, data of the additional image-associated keyword in which the additional keyword [Yoritomo] Kd1 and the image-associated keyword [Minamoto no Yoritomo] K1 (i.e., [Yoritomo] Kd1/[Minamoto no Yoritomo] K1), which is registered in additional image-associated keyword data area 12e, is registered and stored in the learned keyword data area 12f (step S14).

At this time, the image-associated keyword [Minamoto no Yoritomo] K1 (Ym) corresponding to the additional keyword [Yoritomo] Kd1 is displayed in the vicinity of the additional keyword [Yoritomo] Kd1 (Rm) which is designated in the text part tp in the left screen 17L as shown in (C) of FIG. 6, based on the additional image-associated keyword ([Yoritomo] Kd1/[Minamoto no Yoritomo] K1) which is registered in the additional image-associated keyword data area 12e.

As shown in (C) of FIG. 6, when the image-associated keyword [Hojo Masako] K2 is touched and designated by the pen P1 in the text part tp displayed on the left screen 17L (step S5 (Yes), step S6 (Yes)), the designated image-associated keyword [Hojo Masako] K2 is identified and displayed by a yellow marker Ym. Thereafter, in accordance with the image number [P56-7(8)]associated with the designated image-associated keyword [Hojo Masako] K2 and stored in the image-associated keyword data area 12c, an image G2 of Hojo Masako included in the data of the two-page spread Tx displayed on the right screen 17R is enlarged and displayed on the right screen 17R (step S7).

Then, when the enlarged image G2 of Hojo Masako on display is touched and designated as indicated by the pen P2 (step S8 (Yes)), the image-associated keyword [Hojo Masako] K2 associated with the designated image G2 is registered and stored in the learned keyword data area 12f (step S9).

Figure 7:
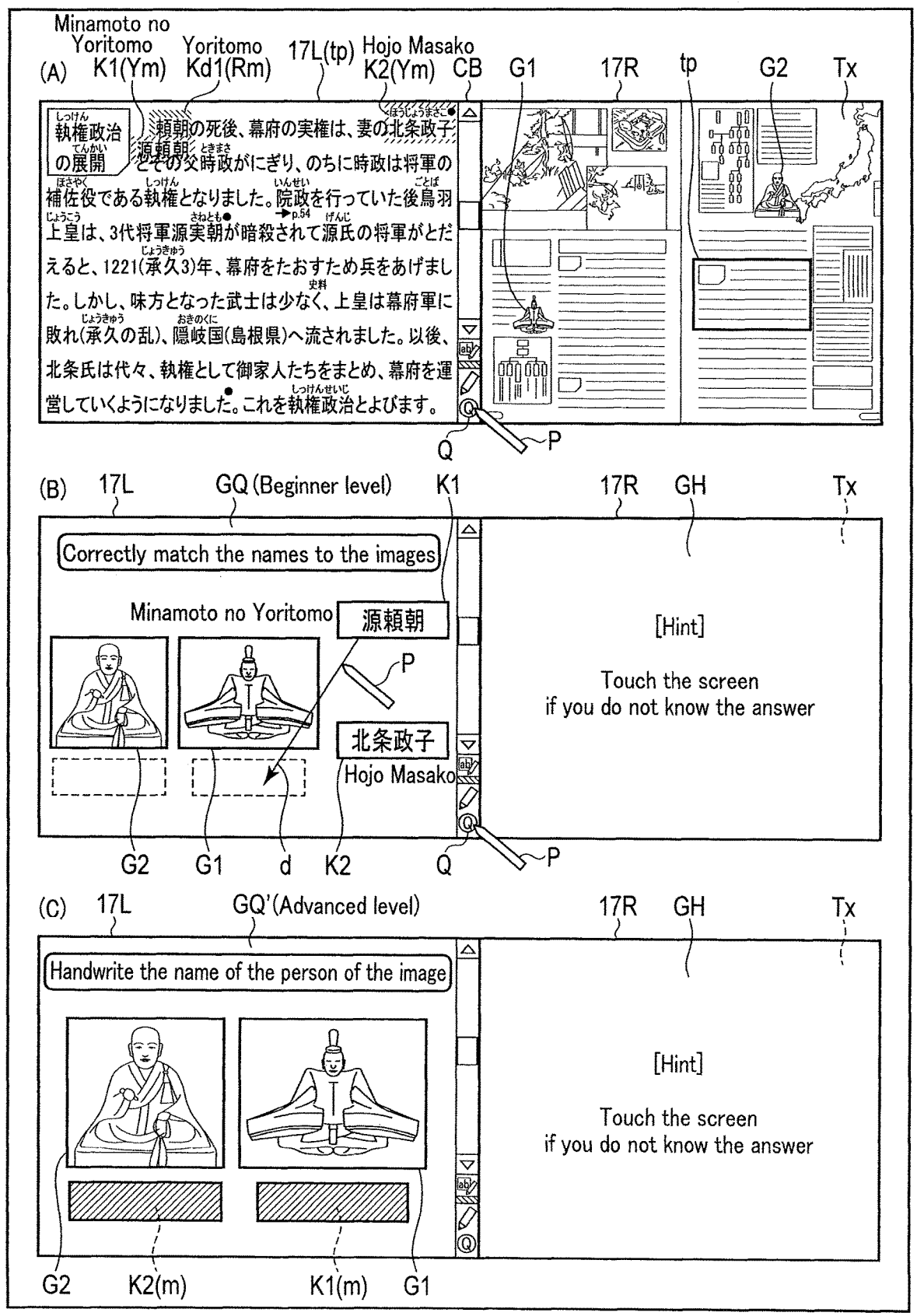
FIG. 7 is a diagram illustrating a problem-setting operation based on (A) a keyword and an associated image according to the lecturer terminal process (parts 2 and 3) of the electronic blackboard (lecturer terminal) 10.

FIG. 7 is a diagram illustrating a (A) a process of outputting a problem based on a keyword and an associated image according to the lecturer terminal process (part 2 and part 3) of the electronic blackboard (lecturer terminal) 10.

When the problem setting icon Q in the control box CB is touched by the pen P after the enlarged display of the image G2 of Hojo Masako in the right screen 17R is canceled in accordance with the user (the lecturer Le) operation or canceled after a certain period of time elapses, as shown in (A) of FIG. 7 (step S24 (Yes)), it is determined whether or not a learned keyword is registered in the learned keyword data area 12f (step S25).

Herein, it is determined that the additional image-associated keyword in which the additional keyword and the image-associated keyword that are registered in step S14 are associated (i.e., [Yoritomo] Kd1/[Minamoto no Yoritomo] K1), and the image-associated keyword registered in step S9 ([Hojo Masako] K2) are registered as learned keywords in the learned keyword data area 12f (step S25 (Yes)), It is then determined that whether or not the image-associated keywords ([Minamoto no Yoritomo] K1, [Hojo Masako] K2) registered as the learned keywords are associated with position information of a part of the designated image (designated image part) (step S26).

Herein, because it is determined that the image-associated keywords ([Minamoto no Yoritomo] K1, [Hojo Masako] K2) registered as the learned keywords are not associated with position information of a part of the designated image (designated image part) (step S26 (No)), the (A) process of outputting a problem based on a keyword and an associated image is performed (step SA).

First, it is determined that a problem setting level stored in the problem setting level data area 12g is "beginner level" for a learned keyword registered in the learned keyword data area 12f (the additional image-associated keyword ([Yoritomo] Kd1/[Minamoto no Yoritomo] K1) and an image-associated keyword ([Hojo Masako] K2) (step A1 (Yes))

Then, as shown in (B) of FIG. 7, arrangement data for arranging a beginner-level problem in the left screen 17L is generated to randomly arrange the image-associated keywords included in the learned keywords ([Minamoto no Yoritomo] K1 and [Hojo Masako] K2) in a vertical direction, to randomly arrange the images associated with the image-associated keywords K1 and K2 (the image G1 of Minamoto no Yoritomo and the image G2 of Hojo Masako) in a horizontal direction, and to add a problem-setting message, "Correctly put the names to the images" to the left screen 17L (step A2, step A3).

Then, the beginner-level problem screen GQ which is generated in accordance with the arrangement data for a beginner level problem is displayed on and output to the left screen 17L (or each lecture attendant terminal 20) (step A6).

At this time, all data of the two-page spread Tx (P56-57) displayed on the right screen 17R is hidden by the display of a hint screen GH where a hint message "[Hint] Touch the screen if you do not know the answer" is shown. The user (lecture attendant St) touches the hint screen GH to display the data of the entire two-page spread Tx (P56-57) so that the user can refer to the two-page spread Tx as a hint for the beginner-level problem (GQ).

In the beginner-level problem screen GQ, for example, a user (lecture attendant St) who is nominated by the lecturer Le drags as indicated by arrow d and arranges the randomly-arranged image-associated keywords K1 and K2 respectively to the randomly-arranged images G1 and G2, a false/correction determination is made by determining whether the dragged image-associated keyword Kn is registered as an image-associated keyword that is associated with the image Gn to which the keyword is dragged (step A7).

For example, as shown in (B) of FIG. 7, if the image-associated keyword [Minamoto no Yoritomo] K1 is dragged by the pen P as indicated by arrow d and arranged besides the image G1, a message indicating that the problem is correctly answered, "Correct", is displayed, and a chime-like sound is output from the sound output unit 18 (step A7 (Correct), then proceeds to step A8).

On the other hand, for example, if the image-associated keyword [Hojo Masako] K2 is dragged by the pen P as indicated by arrow d and is arranged besides the image G1, a message indicating that the problem is incorrectly answered, "Incorrect", is displayed, and a buzzer is output from the sound output unit 18 (step A7 (Incorrect), then proceeds to step A9).

Thereafter, in a state of displaying the beginner-level problem screen GQ, if the problem setting icon Q in the control box CB is touched again, an advanced-level problem screen GQ' is displayed as shown in (C) of FIG. 7 (step A1 (No), then proceeds to step A4 and step A5).

In other words, arrangement data for arranging an advanced-level problem in the left screen 17L is generated to randomly arrange in a horizontal direction the image-associated keywords included in the learned keywords ([Minamoto no Yoritomo] K1 and [HojoMasako] K2) which are hidden by the marker m and randomly arrange these keywords, to randomly arrange the images associated with the image-associated keywords K1 and K2 (the image G1 of Minamoto no Yoritomo and the image G2 of Hojo Masako) over the image-associated keywords K1 (m) and K2 (m) which are hidden by the marker m, and to add a problem-setting message "Handwrite the name of the person of the image" to the keywords and images (step A4, step A5).

Then, the advanced-level problem screen GQ which is generated in accordance with the arrangement data for the advanced level problem is displayed on and output to the left screen 17L (or each lecture attendant terminal 20) (step A6).

When "Minamoto no Yoritomo" is input by handwriting into and displayed in the frame for the image-associated keyword K1 (m) arranged below the image G1 and hidden by the marker m by an operation of, for example, a user (lecture attendant St) who is nominated by the lecturer Le, a message indicating that the answer is correct, "Correct", is displayed in the advanced-level problem screen GQ', and a chime-like sound is output from the sound output unit 18 (step A7 (Correct), then proceeds to step A8).

On the other hand, for example, if "Hojo Masako" is input by handwriting into and displayed in the frame for the image-associated keyword K1 (m) arranged below the image G1 and hidden by the marker m, a message indicating that the answer is incorrect, "Incorrect", is displayed, and a buzzer is output from the sound output unit 18 (step A7 (Incorrect), then proceeds to step A9).

Accordingly, the lecturer Le only needs to designate and emphasize an important keyword (an image-associated keyword Kn and a related additional keyword Kdn) and an image Gn associated with the keyword Kn (Kdn), in the process of giving the lecture, while displaying on the left screen 17L an enlarged text part tp which is a focus of the lecture among the data of the two-page spread Tx (P56-57) of the document (textbook), which is a subject of the current lecture and displayed on the right screen 17R, and pointing out important matters with a pen P, etc.; it is thereby possible to automatically generate (A) problem data based on the keyword and the associated image in line with the lecture content, and to display and output the problem data (or to transmit and output the problem data to each attendant terminal 20)

Furthermore, the lecture attendant St can perform timely learning in accordance with the content of the lecture given by the lecturer Le about the important keywords and the associated images through the beginner-level problem screen GQ and the advanced-level problem screen GQ' that are output in accordance with the (A) problem data based on the keyword and the associated image.

Figure 8:
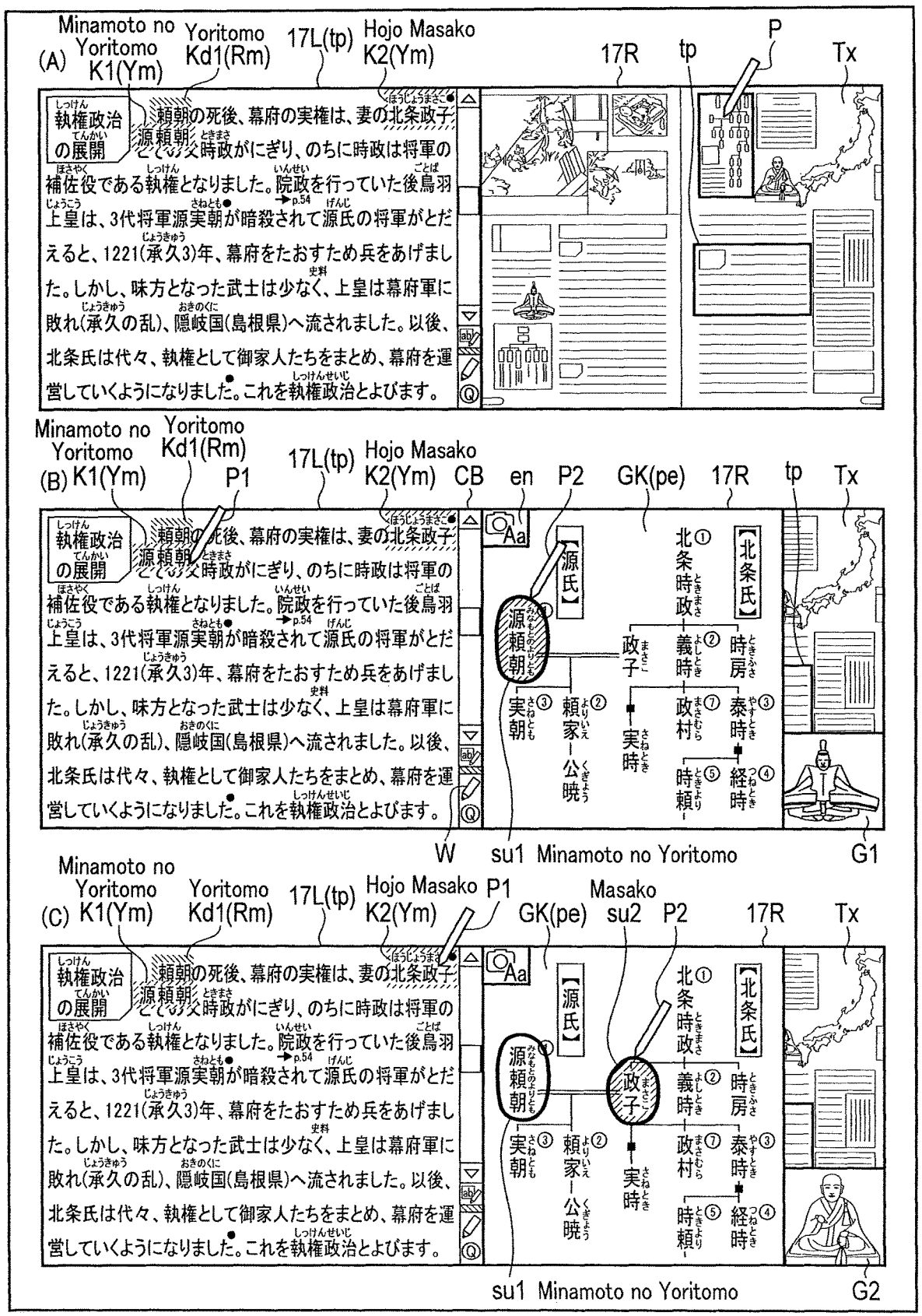
FIG. 8 is a diagram illustrating a display operation (part 2) of lecture content corresponding to a user (lecturer) operation according to the lecturer terminal process (part 2) of the electronic blackboard (lecturer terminal) 10.

FIG. 8 is a diagram illustrating a display operation (part 2) of lecture content corresponding to a user (lecturer) operation according to the lecturer terminal process (part 2) of the electronic blackboard (lecturer terminal) 10.

Figure 9:
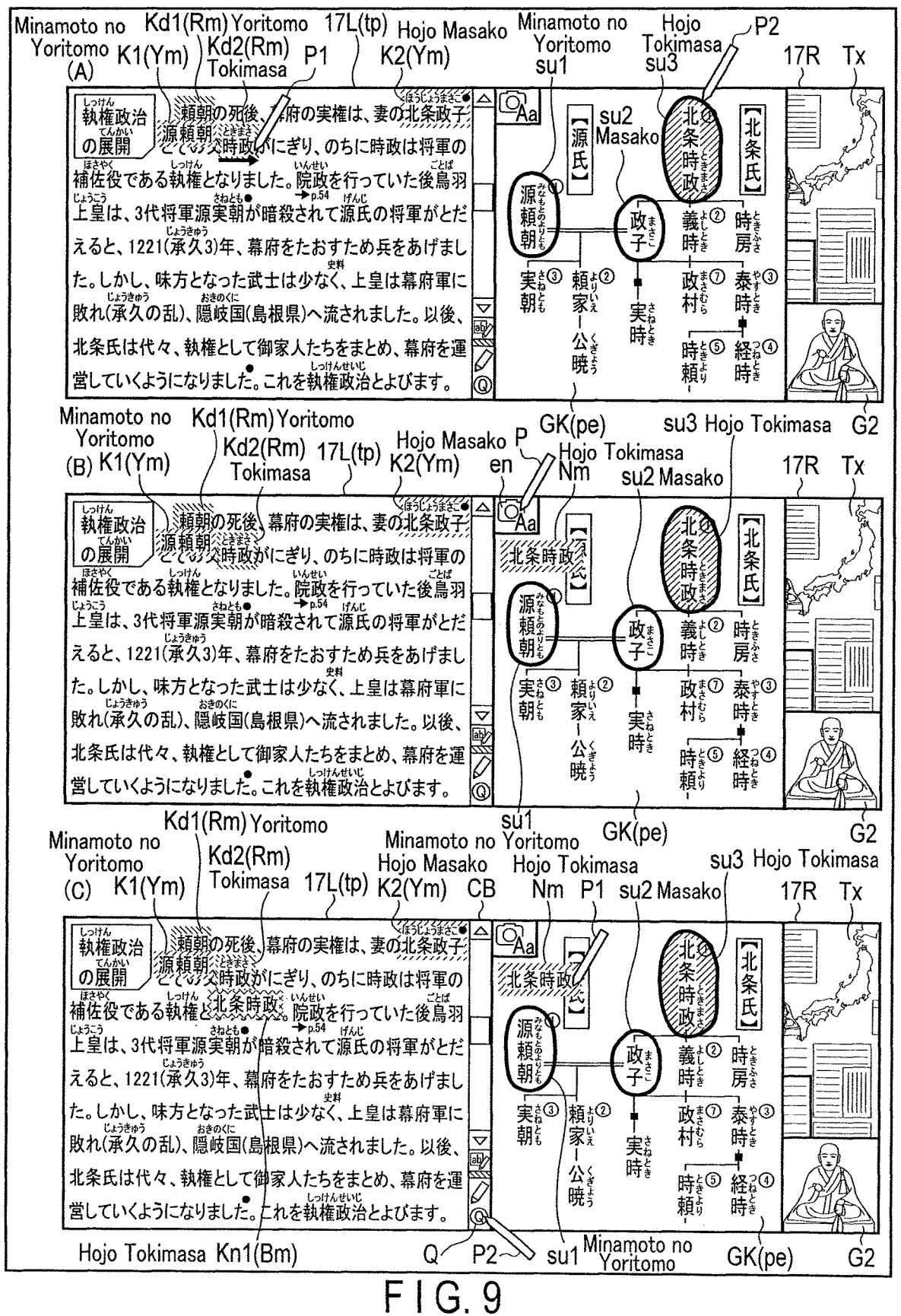
FIG. 9 is a diagram illustrating a display operation (part 3) of lecture content corresponding to a user (lecturer) operation according to the lecturer terminal process (part 2) of the electronic blackboard (lecturer terminal) 10.

FIG. 9 is a diagram illustrating a display operation (part 3) of lecture content corresponding to a user (lecturer) operation according to the lecturer terminal process (part 2) of the electronic blackboard (lecturer terminal) 10.

In accordance with the above-described lecture, as shown in (A) of FIG. 8, the data of the two-page spread Tx (P56-57) of the document (textbook), which is a subject of the current lecture, is displayed on the right screen 17R, a text part tp in the two-page spread Tx (P56-57) is enlarged and displayed in the left screen 17L, the image-associated keywords [Mi-namoto no Yoritomo] K1 and [Hojo Masako] K2 are identified and displayed by a yellow marker Ym, and the additional keyword [Yoritomo] Kd1 is identified and displayed by a red marker Rm. Then, the image of [Family Trees of Minamoto Clan and Hojo Clan] included in the two-page spread Tx on the right screen 17R is touch-operated by the pen P and designated (step S17 (Yes)).

Then, as shown in (B) of FIG. 8, the designated image [Family Trees of Minamoto Clan and Hojo Clan] GK is enlarged and displayed on the right screen 17R, and when the enlarged image GK on display is touch-operated, the display area of the image GK is set to a handwriting mode, and the image GK is displayed, being surrounded by a pink frame pe (step S18). At this time, a character recognition icon en is added to and displayed in the display area of the image [Family Trees of Minamoto Clan and Hojo Clan] GK that is set in the handwriting mode.

Herein, after the image-associated keyword [Minamoto no Yoritomo] K1 ([Yoritomo] Kd1) that is identified and displayed in the left screen 17L is touch-operated and designated as indicated by the pen P1 (step S19 (Yes)), the part "Minamoto no Yoritomo" included in the image [Family Trees of Minamoto Clan and Hojo Clan] GK (pe) displayed on the right screen 17R is designated by a surrounding operation su1 as indicated by the pen P2 (step S20 (Yes)). Then, the image-associated keyword [Minamoto no Yoritomo] K1 ([Yoritomo] Kd1) designated in the left screen 17L, the image number [P56-7(6)] of the enlarged image [Family Trees of Minamoto Clan and Hojo Clan] GK that is displayed on the right screen 17R, and position information of the image part (su1) designated in the image GK (i.e., a designated image part) are associated, and registered and stored as an additional image-associated keyword in the additional image-associated keyword data area 12e (step S21).

Then, data of the additional image-associated keyword registered in the additional image-associated keyword data area 12e ([Minamoto no Yoritomo] K1 ([Yoritomo]Kd1)/image number [P56-7(6)]/designated image part (su1)), in which the image-associated keyword [Minamoto no Yoritomo] K1 ([Yoritomo] Kd1), the image number [P56-7(6)] of the image [Family Trees of Minamoto Clan and Hojo Clan] GK, and position information of the image part (su1) designated in the image GK (i.e., a designated image part) are associated, is registered and stored in the learned keyword data area 12f (step S22).

Subsequently, similar to the above, after the image-associated keyword [Hojo Masako] K2 that is identified and displayed in the left screen 17L is touch-operated and designated as indicated by the pen P1 in (C) of FIG. 8 (step S23 (No), then proceeds to step S19 (Yes)), the part "Masako" included in the image [Family Trees of Minamoto Clan and Hojo Clan] GK (pc) displayed on the right screen 17R is designated by a surrounding operation su2 as indicated by the pen P2 (step S20 (Yes)). Then, the image-associated keyword [Hojo Masako] K2 designated in the left screen 17L, the image number [P56-7 (6) ] of the image [Family Trees of Minamoto Clan and Hojo Clan] GK that is enlarged and displayed on the right screen 17R, and position information of the image part (su2) designated in the image GK (i.e., a designated image part) are associated, and registered and stored as an additional image-associated keyword in the additional image-associated keyword data area 12e (step S21).

Then, data of the additional image-associated keyword registered in the additional image-associated keyword data area 12e ([Hojo Masako] K2)/image number [P56-7 (6)

]/designated image part (su2)), in which the image-associated keyword [Hojo Masako] K2, the image number [P56-7 (6) ] of the image [Family Trees of Minamoto Clan and Hojo Clan] GK, and position information of the image part (su2) designated in the image GK (i.e., a designated image part) are associated, is registered and stored in the learned keyword data area 12f (step S22).

Then, after the additional keyword [Tokimasa] Kd2 in the text part tp that is displayed enlarged on the left screen 17L is touch-operated and identified by a red marker Rm as indicated by the pen P1 in (A) of FIG. 9 (step S23 (No), then proceeds to step S19 (Yes)), the part "Hojo Tokimasa" included in the image [Family Trees of Minamoto Clan and Hojo Clan] GK (pe) displayed on the right screen 17R is designated by a surrounding operation su3 as indicated by the pen P2 (step S20 (Yes)). Then, similar to the above, the additional keyword [Tokimasa] Kd2 designated in the left screen 17L, the image number [P56-7 (6) ] of the image [Family Trees of Minamoto Clan and Hojo Clan] GK that is enlarged and displayed on the right screen 17R, and position information of the image part (su3) designated in the image GK (i.e., a designated image part) are associated, and registered and stored as an additional image-associated keyword in the additional image-associated keyword data area 12e (step S21).

Then, similar to the above, data of the additional image-associated keyword registered in the additional image-associated keyword data area 12e ([Tokimasa] Kd2/image number [P56-7 (6) ]/designated image part (su3)),in which the additional keyword [Tokimasa] Kd2, the image number [P56-7 (6) ] of the image [Family Trees of Minamoto Clan and Hojo Clan] GK, and position information of the image part (su3) designated in the image GK (i.e., a designated image part) are associated, is registered and stored in the learned keyword data area 12f (step S22).

Herein, as shown in (B) of FIG. 9, when the character recognition icon en in the image [Family Trees of Minamoto Clan and Hojo Clan] GK (pe), which is displayed enlarged on the right screen 17R and set in a handwriting mode, is touch-operated by the pen P, a character string included in the designated image part (su3) is character-recognized, and is displayed as a recognized character string [Hojo Tokimasa] Nm. Then, the recognized character string Nm is further associated with the additional keyword [Tokimasa] Kd2 included in the additional image-associated keyword registered in the learned keyword data area 12f ([Tokimasa] Kd2/image number [P56-7(6)]/designated image part (su3)), and is registered as the recognized keyword [Hojo Tokimasa] Kn1 (step S19 to step S22).

At this time, as indicated by the pen P1 in (C) of FIG. 9, when the recognized character string Nm (recognized keyword [Rojo Tokimasa] Kn1) displayed in the image [Family Trees of Minamoto Clan and Hojo Clan] GK on the right screen 17R is touch-operated and displayed, the designated recognized keyword [Hojo Tokimasa] Kn1 is identified by a blue marker Bm based on the additional image-associated keyword ([Tokimasa] Kd2/[Hojo Tokimasa] Kn1/image number [P56-7(6)]/designated image part (su3)) registered in the learned keyword data area 12f, and is identified by a blue marker Bm and displayed in the vicinity of the additional keyword [Tokimasa] Kd2 (Rm) that is identified in the left screen 17L.

Figure 10:
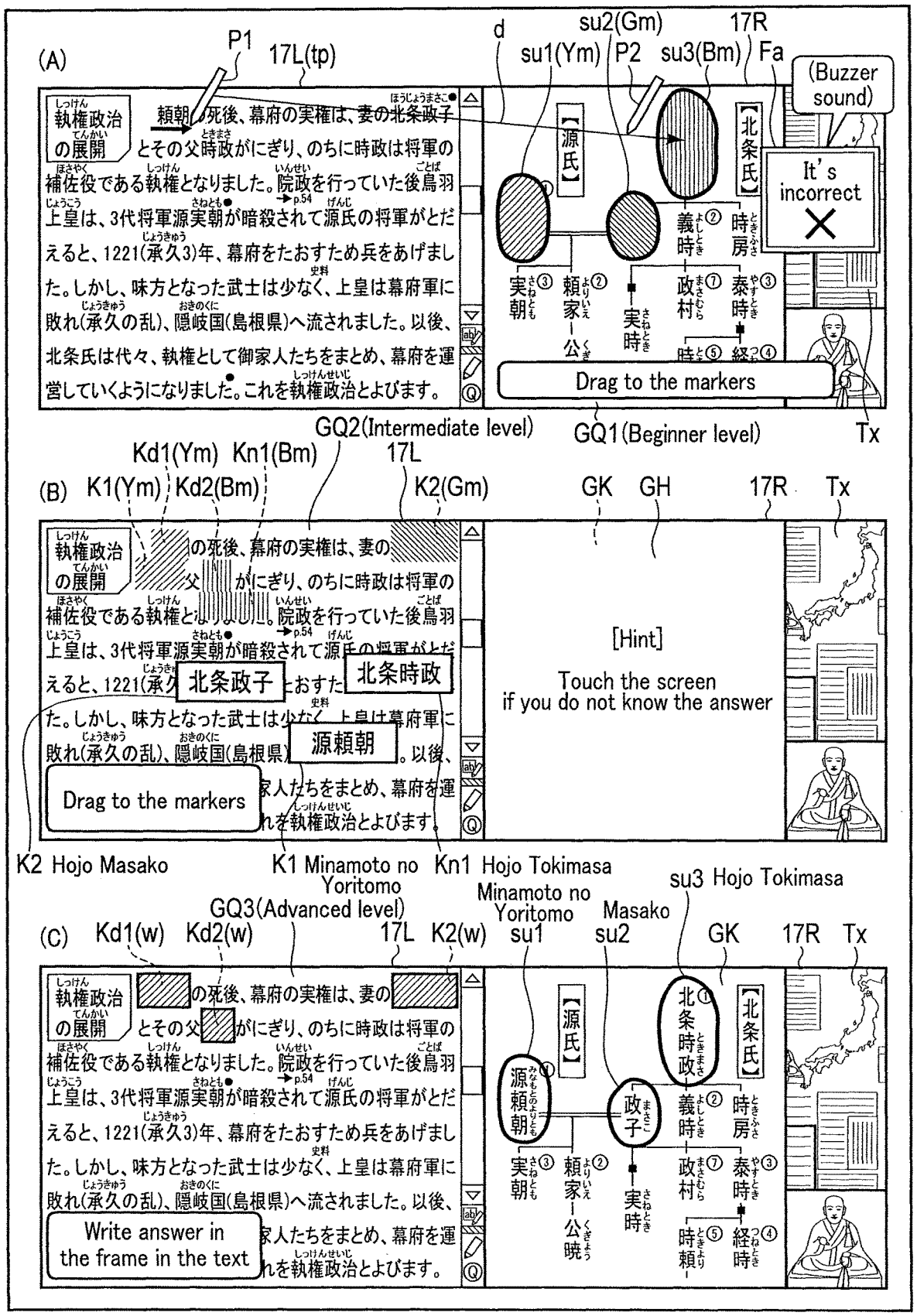
FIG. 10 is a diagram illustrating a problem-setting operation based on (B) a keyword and an associated partial image according to the lecturer terminal process (parts 2 and 3) of the electronic blackboard (lecturer terminal) 10.

FIG. 10 is a diagram illustrating a (B) a process of outputting a problem based on a keyword and an associated partial image according to the lecturer terminal process (part 2 and part 3) of the electronic blackboard (lecturer terminal) 10.

In the touch panel-equipped display 17 (17L/17R) shown in (C) of FIG. 9, when the problem-setting icon Q in the control box CB is touch-operated as indicated by the pen P2 (step S24 (Yes)), it is determined, whether or not a learned keyword is registered in the learned keyword data area 12f (step S25).

Herein, it is determined that the data of the first additional image-associated keyword registered in step S22 ((1) [Minamoto no Yoritomo] K1 ([Yoritomo] Kd1)/image number ([P56-7 (6)]/designated image part (su1)), the data of the second additional image-associated keyword ((2) [Hojo Masako] K2/image number ([P56-7 (6) ]/designated image part (su2)), and the data of the third additional image-associated keyword ((3) [Tokimasa] Kd2 ([Hojo Tokimasa] Kn1)/image number ([P56-7 (6) ]/designated image part (su3)) are respectively registered as learned keywords in the learned keyword data area 12f (step S25 (Yes)).

Then, since it is determined that position information of the parts in the designated images (designated image parts (su1), (su2), (su3)) are associated with those three additional image-associated keywords that are registered as the learned keywords (step S26 (Yes)) (B) a process of outputting a problem based on a keyword and an associated partial image is performed (step SB).

First, it is determined that the problem-setting level stored in the problem-setting level data area 12g for the learned keywords registered in the learned keyword data area 12f ((1) [Minamoto no Yoritomo] K1 ([Yoritomo] Kd1)/image number ([P56-7 (6) ]/designated image part (su1)); (2) [Hojo Masako] K2/image number ([P56-7 (6) ]/designated image part (su2) ; and (3) [Tokimasa] Kd2 ([Hojo Tokimasa] Kn1)/image number ([P56-7 (6) ]/designated image part (su3)) is a beginner level (step B1 (beginner level)).

Then, as shown in (A) of FIG. 10, arrangement data for arranging beginner-level problems on the left screen is generated to arrange on the left screen 17L a text part tp that includes the image-associated keywords included in the learned keywords ([Minamoto no Yoritomo] K1 ([Yoritomo] Kd1), [Hojo Masako] K2, [Tokimasa] Kd2 ([Hojo Tokimasa] Kn1)) (step B2).

For the right screen 17R, arrangement data for arranging beginner-level problems on the right screen is generated to arrange the enlarged image [Family Trees of Minamoto Clan and Hojo Clan] GK, and to add a problem-setting message "Drag to the markers" to the image GK, based on the image number [P56-7(6)] and the designated image parts (su1), (su2), (su3) included in the learned keywords (step B3). In the image GK, the designated image part "Minamoto no Yoritomo" (su1) is hidden by a yellow marker Ym, the designated image part "Masako" (su2) is hidden by a green marker Gm, and the designated image part "Hojo Tokimasa" (su3) is hidden by a blue marker Bin.

Then, the text part tp generated in accordance with the arrangement data for arranging the beginner-level problems on the left screen is displayed on and output to the left screen 17L, and a beginner-level problem screen GQ1 that is generated in accordance with the arrangement data for arranging the beginner-level problems on the right screen is displayed on and output to the right screen 17R (or transmitted and output to each attendant terminal 20) (step A6).

In the beginner-level problem screen GQ1, by an operation of a user (lecture attendant St) who is nominated by the lecturer Le, for example, a character string of an image-associated keyword Kn included in the text part tp displayed on the left screen 17L is dragged as indicated by arrow d and fitted into a designated image part (su1), (su2), or (su3) which is hidden by a marker. Then, a correct/false determination is made by determining whether or not the dragged image-associated keyword Kn corresponds to an image-associated keyword registered in association with a designated image part (su1), (su2), or (su3), [Minamoto no Yoritomo] K1, [Hojo Masako] K2, and [Hojo Tokimasa kn1], (step A7).

For example, as indicated by the pen P1 and the P2 in (A) of FIG. 10, when the additional image-associated keyword [Yoritomo] Kd1 displayed on the left screen 17L is dragged as indicated by arrow d and fitted into the designated image part (su3) in the beginner-level problem screen GQ1 displayed on the right screen 17R, a message Fa indicating a false answer is input, "It' s incorrect", is displayed, and a buzzer is output from the sound output unit 18 (step A7 (Incorrect), then proceeds to step A9).

On the other hand, when the additional image-associated keyword [Hojo Masako] K2 displayed on the left screen 17L is dragged as indicated by arrow d and fitted into the designated image part (su2) in the beginner-level problem screen GQ1 displayed on the right screen 17R, a message indicating a correct answer is input, "It's correct", is displayed, and a chime-like sound is output from the sound output unit 18 (step A7 (Correct), then proceeds to step A8).

Thereafter, while the beginner-level problem screen GQ1 is displayed, if the problem-setting icon Q in the control box CB is touched again, an intermediate-level problem screen GQ2 is displayed in the left screen 17L as shown in (B) of FIG. 10 (step B1 (intermediate level), then proceeds to step B4 and step B5).

Then, arrangement data for arranging intermediate-level problems for the left screen 17L is generated to arrange, as shown in (B) of FIG. 10, the text part tp that includes image-associated keywords included in the learned keywords ([Minamoto no Yoritomo K1 ([Yoritomo] Kd1), [Hojo Masako] K2, [Hojo Tokimasa] Kn1 ([Tokimasa] Kd2)) in the left screen 17L, being hidden by a yellow marker Ym, a green marker Gm, and a blue marker Bm, to randomly re-arrange the image-associated keywords that are hidden by the markers in the screen 17L, and to add a problem-setting message "Drag to the markers" to the screen 17L (step B4).

Arrangement data for arranging intermediate-level problems for the right screen is generated to arrange the image [Family Trees of Minamoto Clan and Hojo Clan] GK, which includes the designated image parts (su1), (su2), (su3), enlarged on the right screen 17R, and to arrange a hint screen GH showing a hint message " [Hint] Touch the screen if you do not know the answer" on the right screen 17R to hide the image GK (step B5).

Then, the intermediate-level problem screen GQ2 generated in accordance with the data for arranging the intermediate-level problems on the left screen is displayed on and output to the left screen 17L, and the hint screen GH that hides the image [Family Trees of Minamoto Clan and Hojo Clan] GK generated in accordance with the data for arranging the intermediate-level problems on the right screen is displayed on and output to the right screen 17R (or transmitted and output to each attendant terminal 20) (step A6).

In the intermediate-level problem screen GQ2, by an operation of a user (lecture attendant St) who is nominated by the lecturer Le, for example, each of the image-associated keywords Kn that is randomly displayed in the screen GQ2 is dragged as indicated by arrow d to a part of a character string that is hidden by a marker (K1 (Ym), Kd1 (Ym)), (K2 (Gm)) or (Kd2 (Bm), Kn1 (Bm)). Then, a correct/false determination is made by determining whether or not the dragged image-associated keyword Kn corresponds to an image-associated keyword [Minamoto no Yoritomo] K1, [Hojo Masako] K2, or [Rojo Tokimasa] Kn2, which are hidden by the portions hidden by the markers (K1 (Ym), Kd1 (Ym)), (K2 (Gm)) or (Kd2 (Bm), Kn1 (Bm)) (step A7).

For example, when the image-associated keyword [Minamoto no Yoritomo] K1 randomly displayed on the intermediate-level problem screen GQ2 is dragged as indicated by arrow d and fitted into the part of the character string hidden by the yellow marker Ym in the screen GQ2 displayed on the left screen 17L (K1 (Ym), Kd1 (Ym)), a message indicating a correct answer is input, "It's correct", is displayed, and a chime-like sound is output from the sound output unit 18 (step A7 (Correct), then proceeds to step A8).

On the other hand, for example, when the image-associated keyword [Hojo Tokimasa] Kn1 randomly displayed on the intermediate-level problem screen GQ2 is dragged as indicated by arrow d and fitted into the part of the character string hidden by the green marker Gm in the screen GQ2 displayed on the left screen 17L (K2(Gm)), a message indicating an incorrect answer is input, "It's incorrect", is displayed, and a buzzer is output from the sound output unit 18 (step A7 (Incorrect), then proceeds to step A9).

Thereafter, while the intermediate-level problem screen GQ2 is displayed, if the problem-setting icon Q in the control box CB is touched again, an advanced-level problem screen GQ3 is displayed in the left screen 17L as shown in (C) of FIG. 10 (step B1 (advanced level), then proceeds to step B6 and step B7).

Then, arrangement data for arranging advanced-level problems in the left screen is generated to, as shown in (C) of FIG. 10, arrange in the left screen 17L the text part tp that includes the image-associated keywords ([Minamoto no Yoritomo] K1 ([Yoritomo] Kd1), [Hojo Masako] K2, [Hojo Tokimasa] Kn1 ([Tokimasa] Kd2) included in the learned keywords, being respectively hidden by a frame w for inputting handwritten letters, and to add a problem-setting message "Write answer in the frame in the text" to the left screen 17L (step B6).

Arrangement data for arranging intermediate-level problems for the right screen is generated to arrange on the right screen 17R the enlarged image [Family Trees of Minamoto Clan and Hojo Clan] GK for which the designated image parts (su1), (su2), (su3) are set, and to arrange a hint screen GH showing a hint message "[Hint] Touch the screen if you do not know the answer" in the right screen 17R to hide the image GK (step B7).

Then, the advanced-level problem screen GQ3 generated in accordance with the arrangement data for arranging the advanced-level problems on the left screen is displayed on and output to the left screen 17L, and the hint screen GH that hides the image [Family Trees of Minamoto Clan and Hojo Clan] GK generated in accordance with the arrangement data for arranging the advanced-level problems on the right screen is displayed on and output to the right screen 17R (or transmitted and output to each attendant terminal 20) (step A6).

The right screen 17R in (C) of FIG. 10 shows a state in which the image [Family Trees of Minamoto Clan and Hojo Clan] GK that was hidden by the hint screen GH is now displayed by touching the hint screen GH.

In the advanced problem screen GQ3, by an operation of a user (lecture attendant St) who is nominated by the lecturer Le, for example, a character string is input by handwriting to a frame w, which hides a part of a character string of each image-associated keyword (K1(Ym), Kd1(Ym)), (K2(Gm)) or (Kd2(Bm), Kn1(Bm)), for inputting handwritten letters as an answer. Then, a correct/false determination is made by determining whether or not the input character string corresponds to an image-associated keyword [Yoritomo] Kd1, [Hojo Masako] K2, or [Tokimasa] Kd2, which are hidden by the input frames (Kd1 (w)), (K2 (w)), (Kd2 (w)) (step A7).

For example, if [Yoritomo] Kd1 is input by handwriting to the input frame (KD1(w)) in the advanced-level problem screen GQ3 displayed on the left screen 17L, a message indicating a correct answer is input, "It's correct", is displayed, and a chime-like sound is output from the sound output unit 18 (step A7 (Correct), then proceeds to step A8).

On the other hand, for example, if [Yoritomo] Kd1 is input by handwriting to the input frame (Kd2 (w)) in the advanced-level problem screen GQ3 displayed on the left screen 17L, a message indicating a correct answer is input, "It's incorrect", is displayed, and a buzzer is output from the sound output unit 18 (step A7 (Incorrect), then proceeds to step A9).

Accordingly, the lecturer Le only needs, after designating and displaying enlarged on the left screen 17L an image GK included in the two-page spread Tx, to designate and emphasize an important keyword (an image-associated keyword Kn and an additional keyword Kdn) included in the text part tp and apart (sun) (n=1, 2, . . . ) of the image GK associated with the keyword Kn (Kdn), in the process of giving the lecture, while displaying an enlarged text part tp which is a focus of the lecture among the data of the two-page spread Tx (P56-57) of the document (textbook), which is a subject of the current lecture and displayed on the right screen 17R, and pointing out important matters with a pen P, etc.; it is thereby possible to automatically generate (B) problem data based on the keyword and the associated partial image in line with the lecture content, and to display and output the problem data (or to transmit and output the problem data to each attendant terminal 20).

Furthermore, the lecture attendant St can perform timely learning in accordance with the content of the lecture given by the lecturer Le about the important keywords and the images that include the important keywords through the beginner-level problem screen GQ1, the intermediate-level problem screen GQ2, and the advanced-level problem screen GQ3 that are output in accordance with the (B) problem data based on the keyword and the associated partial image.

When the problem-setting button Q displayed in the control box CB is touch-operated (step S24 (Yes)), if it is determined that there is no data of learned keywords registered in the learned keyword data area 12f (step S25 (No)), a message "No data for problem setting" is displayed (step S27).

In the embodiment, an operation of designating a character string, such as a keyword included in a text part tp that is displayed in the left screen 17L, and an operation of designating an image displayed in the right screen 17R are performed through a user touch-operation; however, the operations may be performed by moving a cursor in the display or moving a mouse.

The lecture attendant terminal (tablet terminal or the like) 20, which each lecture attendant St (e.g., a student) has, may be configured to have the same function as the electronic blackboard (lecturer terminal) 10. Thereby, each lecture attendant St can operate the lecture attendant terminal 20 in the same manner as the lecturer (instructor or the like) Le operates the electronic blackboard 10 during the lecture. Thus, similar to the above, each lecture attendant terminal 20 itself can register learned keywords, and generate (A) problems based on a keyword and an associated image and (B) problems based on a keyword and an associated partial image, and each lecture attendant St can carry out timely learning in accordance with the content of the lecture given by an instructor (e.g., the lecturer Le).

The methods of the respective processes by the electronic blackboard (lecturer terminal) 10, which has been described in each of the above embodiments, that is, the methods of the lecturer terminal process (parts 1 to 3), etc. illustrated in the flowcharts of FIG. 3, FIG. 4 and FIG. 5 can be stored as computer-executable programs in a medium such as a memory card (ROM card, RAM card, etc.), a magnetic disk (floppy (trademark) disk, hard disk, etc.), an optical disc (CD-ROM, DVD, etc.), or a semiconductor memory, and can be distributed.

In addition, the data of the program for realizing each of the above-described methods can be transmitted on a communication network in the form of a program code, and the data of the program can be taken in a computer of an electronic device connected to the communication network. Thereby, the above-described function of generating problem data corresponding to the content of the lecture and the function of setting the problem of the problem data can be realized.

Additional advantages and modifications will readily occur to those skilled in the art. Therefore, the invention in its broader aspects is not limited to the specific details and representative embodiments shown and described herein. Accordingly, various modifications maybe made without departing from the spirit or scope of the general inventive concept as defined by the appended claims and their equivalents.

What is claimed is:

1. An information display apparatus comprising:
a display;
a processor, the processor being configured to:
detect a first user operation to designate at least one keyword in a text displayed on the display, and change a display state of the designated at least one keyword to visually indicate that the at least one keyword has been designated, wherein the designated at least one keyword is associated in advance in a first memory area of a memory with an image included in the text displayed on the display;
identify, by referring to the first memory area of the memory, the image associated with the designated at least one keyword and that is included in the text displayed on the display, and cause the display to display the identified image in an enlarged manner such that a display size of the identified image is larger than a display size thereof prior to designation of the at least one keyword associated therewith by the first user operation;
detect a second user operation to designate the identified image displayed in the enlarged manner in a state in which the designated at least one keyword is displayed in the changed display state, and in response to detection of the second user operation in the state in which the designated at least one keyword is displayed in the changed display state, register the designated at least one keyword and information of the identified image in a second memory area of the memory as data in which the designated at least one keyword and the information of the identified image are associated with each other; and
detect a third user operation in a state in which the designated at least one keyword and the information of the identified image are registered in the second memory area of the memory as said data, and, in response to detection of said third user operation, generate a new problem based on the registered at least one keyword and the image corresponding to the registered information, and output the generated new problem, wherein the processor is further configured to:

display the text in a first display area of the display, the text including character strings and the image;

display, in a second display area of the display, a location indicator indicating a location of a portion of the text displayed in the first display area; and display, in a third display area of the display, the portion of the text at the location indicated by the location indicator in an enlarged manner such that a display size of the portion of the text in the third display area is larger than a display size of the portion of the text displayed in the first display area, wherein the processor updates the portion of the text displayed in the third display area in accordance with a fourth user operation to move the location indicator to indicate a new location.

2. The information display apparatus according to claim 1, wherein the processor designates an image part in the image in accordance with a fifth user operation.

3. The information display apparatus according to claim 2, wherein if an image part in the image is designated, the processor registers information of the designated image part as data in which the information of the designated image part is associated with the designated at least one keyword.

4. The information display apparatus according to claim 3, wherein the processor generates and outputs, as the new problem, a problem based on the registered at least one keyword and the image part corresponding to the registered information of the designated image part.

5. The information display apparatus according to claim 3, wherein the processor generates and outputs, as the new problem, a problem that requires a user to relate the registered at least one keyword to the image part which is hidden.

6. The information display apparatus according to claim 3, wherein the processor generates and outputs, as the new problem, a problem that requires a user to input the registered at least one keyword which is hidden, with the image part being shown as a hint.

7. The information display apparatus according to claim 1, wherein the processor identifies and displays a character string corresponding to the designated at least one keyword in the text.

8. The information display apparatus according to claim 1, wherein the processor designates a character string in the displayed text as an additional keyword in accordance with a fifth user operation.

9. The information display apparatus according to claim 8, wherein the processor identifies and displays a character string corresponding to the designated additional keyword in the text.

10. The information display apparatus according to claim 9, wherein if the at least one keyword in the displayed text is designated in accordance with the first user operation, and the additional keyword in the displayed text is designated in accordance with the fifth user operation, the processor registers the designated keyword, the designated additional keyword, and the image as data in which the designated keyword, the designated additional keyword, and information of the image are associated with each other.

11. The information display apparatus, according to claim 10, wherein the processor generates and outputs, as the new problem, a problem based on the registered keyword, additional keyword, and image corresponding to the registered information of the image.

12. The information display apparatus according to claim 10, wherein if the designated at least one keyword, the designated additional keyword, and the information of the image are registered as data in which the designated keyword, and the designated additional keyword, and the information of the image are associated with each other, the processor displays the keyword that is registered as data for the identified and displayed additional keyword in the text.

13. The information display apparatus according to claim 1, wherein the processor generates and outputs, as the new problem, a problem in which the registered at least one keyword and the image are randomly arranged so as to require a user to arrange them.

14. The information display apparatus according to claim 1, wherein the processor arranges the registered at least one keyword and the image which are associated with each other with the registered at least one keyword being hidden, and generates and outputs, as the new problem, a problem that requires a user to input the hidden keyword.

15. The information display apparatus according to claim 1, further comprising the memory.

16. The information display apparatus according to claim 1, wherein the display comprises a touch panel-equipped color display.

17. The information display apparatus according to claim 1, wherein the processor is configured to:

in a state in which the identified image is displayed in the enlarged manner, detect a fifth user operation to designate a character string in the text which is not associated in advance in the memory with the identified image, and change a display state of the designated character string to visually indicate that the character string has been designated;

in a state in which the designated character string is displayed in the changed display state, detect a sixth user operation to designate the identified image displayed in the enlarged manner;

in response to detection of the sixth user operation in the state in which the designated character string is displayed in the changed display state, register, in the memory, the designated character string as an additional keyword in association with the designated at least one keyword that was associated in advance with the image, and register the designated at least one keyword, the designated character string registered as the additional keyword, and the information of the identified image in the second memory area of the memory as data in which the designated at least one keyword, the designated character string registered as the additional keyword, and the information of the image are associated with each other;

in response to detection of the third user operation, generate, as the new problem, a problem based on the registered at least one keyword, the character string registered as the additional keyword, and the image corresponding to the registered information, and output the new problem.

18. An information display method executed by a processor, the method comprising:

detecting a first user operation to designate at least one keyword in a text displayed on a display, and changing a display state of the designated at least one keyword to visually indicate that the at least one keyword has been designated, wherein the designated at least one keyword is associated in advance in a first memory area of a memory with an image included in the text displayed on the display;

identifying, by referring to the first memory area of the memory, the image associated with the designated at least one keyword and that is included in the text displayed on the display, and causing the display to display the identified image in an enlarged manner such that a display size of the identified image is larger than a display size thereof prior to designation of the at least one keyword associated therewith by the first user operation;

detecting a second user operation to designate the identified image displayed in the enlarged manner in a state in which the designated at least one keyword is displayed in the changed display state, and in response to detection of the second user operation in the state in which the designated at least one keyword is displayed in the changed display state, registering the designated at least one keyword and information of the identified image in a second memory area of the memory as data in which the designated at least one keyword and the information of the image are associated with each other; and detecting a third user operation in a state in which the designated at least one keyword and the information of the identified image are registered in the second memory area of the memory as said data, and, in response to detection of said third user operation, generating a new problem based on the registered at least one keyword and the image corresponding to the registered information, and outputting the generated new problem, wherein the method further comprises:

displaying the text in a first display area of the display, the text including character strings and the image;

displaying, in a second display area of the display, a location indicator indicating a location of a portion of the text displayed in the first display area; and displaying, in a third display area of the display, the portion of the text at the location indicated by the location indicator in an enlarged manner such that a display size of the portion of the text in the third display area is larger than a display size of the portion of the text displayed in the first display area, wherein the portion of the text displayed in the third display area is updated in accordance with a fourth user operation to move the location indicator to indicate a new location.

19. A non-transitory recording medium having a processor-readable program recorded thereon that is executable to cause a processor to:

detect a first user operation of an input unit to designate at least one keyword in a text displayed on a display, and change a display state of the designated at least one keyword to visually indicate that the at least one keyword has been designated, wherein the designated at least one keyword is associated in advance in a first memory area of a memory with an image included in the text displayed on the display;

identify, by referring to the first memory area of the memory, the image associated with the designated keyword and that is included in the text displayed on the display, and cause the display to display the identified image in an enlarged manner such that a display size of the identified image is larger than a display size thereof prior to designation of the at least one keyword associated therewith by the first user operation;

detect a second user operation of the input unit to designate the identified image displayed in the enlarged manner in a state in which the designated at least one keyword is displayed in the changed display state, and in response to detection of the second user operation in the state in which the designated at least one keyword is displayed in the changed display state, register the designated at least one keyword and information of the identified image in a second memory area of the memory as data in which the designated at least one keyword and the information of the image are associated with each other; and detect a third user operation of the input unit in a state in which the designated at least one keyword and the information of the identified image are registered in the second memory area of the memory as said data, and, in response to detection of said third user operation, generate a new problem based on the registered at least one keyword and the image corresponding to the registered information, and output the generated new problem, wherein the program further causes the processor to:

display the text in a first display area of the display, the text including character strings and the image;

display, in a second display area of the display, a location indicator indicating a location of a portion of the text displayed in the first display area; and display, in a third display area of the display, the portion of the text at the location indicated by the location indicator in an enlarged manner such that a display size of the portion of the text in the third display area is larger than a display size of the portion of the text displayed in the first display area, wherein the program causes the processor to update the portion of the text displayed in the third display area in accordance with a fourth user operation to move the location indicator to indicate a new location.

\* \* \* \* \*